United States Patent Office 2,694,718
Patented Nov. 16, 1954

2,694,718

SULFOBENZAMIDES

Ilmari Salminen and Arnold Weissberger, Rochester, N. Y., assignors to Eastman Kodak Company, Rochester, N. Y., a corporation of New Jersey No Drawing. Application December 5, 1951, Serial No. 260,099

2 Claims. (Cl. 260—310)

This invention relates to the preparation of sulfobenzamides and sulfopropionamides and particularly to the preparation of o-sulfobenzamides and β-sulfopropionamides.

Anhydrides such as o-sulfobenzoic anhydride have been described in the literature. However, little is known of the reactions of the anhydride with primary aromatic amines. Am. Chem. J. 17, 317, 339, 347; 18, 804, indicate that aniline reacts to form asym. or sym. compounds neither of which contain free sulfonic acid groups. Am. Chem. J. 20, 127, shows that sulfonphthaleins are obtained with dimethyl or diethylanilines. Other references disclose that aniline and toluidine give the corresponding ammonium salts of the sulfoamides. Nowhere is there any indication that it would be possible to react the anhydride with aromatic amines to directly obtain a benzamide containing a free sulfo group. The teachings are that a sulfonic acid salt would be obtained which would have to be neutralized to liberate the free acid.

Similarly, little is known of the reactions of the corresponding aliphatic anhydrides e. g. β-sulfopropionic anhydride. As above, the indications from the prior art are that when the anhydride is reacted with aromatic amines, sulfonic acid salts would be obtained.

We have discovered that the mentioned anhydrides are particularly efficacious for use in the preparation of coupler compounds of especial value in color photography. In certain cases in processes and products for color photography it is desirable that the coupler compounds contain in their molecule —SO₃H groups which increase the solubility of the compounds and in other cases such as in emulsion layers actually tend to prevent diffusion of the coupler compound in the emulsion possibly by virtue of the —SO₃H group attaching itself to basic groups in the colloid vehicle of the emulsion.

During the preparation of the couplers by reacting the anhydrides with coupler compounds containing amino groups, it became apparent that a particularly advantageous process was under consideration. That is, it had been supposed that in a typical reaction between o-sulfobenzoic anhydride and a coupler

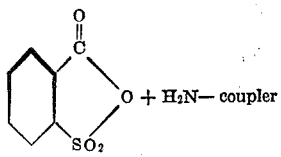

two molecules of the latter compound would be required to provide for formation of the amide group and the salt of the sulfonic acid group. However, it was found that regardless of the quantity of amino coupler used no coupler amine salt was obtained. Accordingly, to obtain the free acid form of the coupler equimolecular parts of the reactants could be used, and it was not necessary to use a neutralizing step to free the sulfonic acid group in the coupler as had been expected.

The compounds of our invention have the general formula

R—CONH—Y in which R is either a mononuclear 2-sulfo-1-aryl group of the benzene series or a β-sulfoethyl group, and Y represents a group of atoms containing a group reactive with the oxidation products of a primary aromatic amino silver halide developing agent e. g. a 5-pyrazolone group having a methylene group in the 4-position which will couple in the presence of exposed silver halide with the oxidized form of the developing agent which results from reduction of the silver halide, to form a dye in situ.

For illustration, the least complex compounds of our invention can be made by reacting the o-sulfobenzoic anhydrides or β-sulfoalkyl anhydrides with simple coupler compounds such as o-aminophenols, 3-amino-5-pyrazolones or couplers containing the group —CO—CH₂—CO— and a terminal NH₂ group. Thus o-sulfobenzoic anhydride yields the following compounds when reacted with o-aminophenol, 3-amino-5-pyrazolone and α-benzoyl-p-amino-acetanilide, respectively

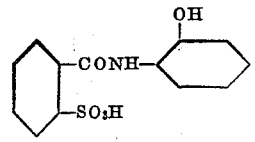

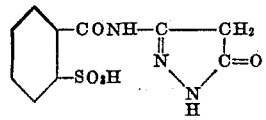

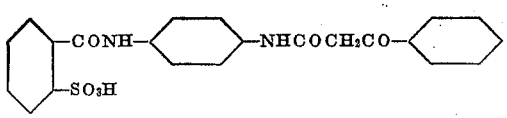

Accordingly, compounds of this type having the o-sulfo aryl group are prepared by our process whereas other methods such as sulfonation cannot be used particularly since sulfonation does not introduce the sulfo group into the right position or has undesired effects upon the coupler compound. It might be thought that o-sulfobenzoyl dichloride would yield amides comparable to those of the invention when reacted with a coupler containing an amino group. However, the literature Ber. 31, 1648 (1898) indicates that this diacid chloride does not form o-sulfobenzoic acid amides.

Similar compounds are obtained when the corresponding aliphatic anhydrides such as β-sulfopropionic anhydride is used for reaction with the coupler compound containing an amino group.

A preferred group of compounds have the general structure

R—CONH—D—Y in which R represents a mononuclear aryl group of the benzene series, D represents a mononuclear 2-sulfo-1-aryl group of the benzene series and Y is as above a group of atoms containing a reactive phenolic hydroxyl or methylene group, is obtained by reacting an ortho-sulfobenzoic acid anhydride with a coupler amine having the formula

H₂N—D—Y in which D and Y are as immediately above. The result is that the free sulfonic acid form of the coupler is more readily directly obtained without salt formation and in better yield than when the amino group in H₂N—D—Y is bonded directly to Y as in the case of o-aminophenol. The higher molecular weight compounds in the examples following illustrate the preparation of such compounds. Of course, in any event where the amino couplers may form a sulfonic acid salt the free acid form of the coupler can be obtained by neutralization.

The compounds of the invention may be further classified as having the general formula

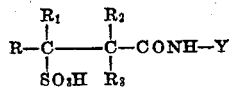

in which R, R₁, R₂ and R₃ each represent hydrogen, alkyl or aryl groups of the benzene series and R, R₁, R₂ and R₃ together represent the non-metallic atoms necessary to complete a mononuclear aryl group of the benzene series. Accordingly, the compounds made from the anhydrides such as o-sulfobenzoic anhydride or β-sulfopropionic anhydride have this formula.

The aromatic anhydrides used have the preferred general formula

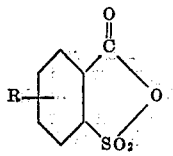

in which R may be hydrogen or one or more substituents such as chlorine or bromine, methyl, ethyl, methoxy, phenoxy, etc.

The preferred aliphatic anhydrides used in our invention have the general formula

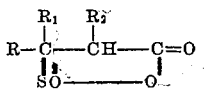

in which R, R₁ and R₂ are either hydrogen or alkyl groups such as β-sulfopropionic and β-sulfoisobutyric anhydride. These anhydrides can be obtained by reaction of aliphatic acids such as propionic valeric, capric, caprylic, caproic, isobutyric, etc. acids with sulfuryl chloride.

The following examples illustrate our invention.

*Example 1*

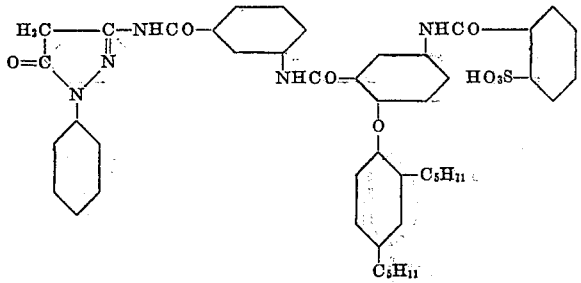

1-phenyl-3-amino-5-pyrazolone is reacted with m-nitro-benzoyl chloride, the resultant amide reduced with hydrogen and the resulting amino group reacted with 2-(2′,4′-diamylphenoxy)-5-nitrobenzoyl chloride. The nitro group of the resultant product is then reduced to obtain 1-phenyl-3-{3′-[5″-amino-2″-(2,4-di-tert. amylphenoxy)-benzamido]-benzamido}-5-pyrazolone.

In a flask is placed 300 volumes of dry toluene. This is heated to boiling and in it is dissolved 3.5 parts of 1-phenyl-3{3′-[5″-amino-2″-(2,4-di-tert. amylphenoxy)-benzamido]-benzamido}-5-pyrazolone. In a flask is dissolved 1 part of o-sulfobenzoic anhydride in 7 parts of hot dry toluene. This solution is added rapidly with stirring to the boiling solution of the amine. The mixture becomes cloudy and the sticky product is deposited on the walls of the flask. The reaction is assisted by heating on a steam bath with stirring for one hour. It is then cooled to room temperature under cold running water and the solidified product is broken up with a stirring rod. It is separated by filtration and washed with petroleum ether and dried. The solid is crushed in a mortar to a fine powder, suspended in petroleum ether and filtered and dried. The product is obtained as a tan powder.

*Example 2*

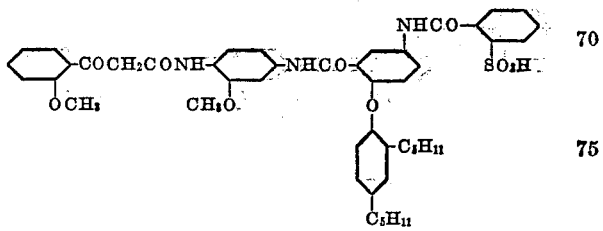

α-2-methoxybenzoyl-4-amino-2-methoxyacetanilide is reacted with 2-(2′,4′-di-tert. amyl phenoxy)-5-nitro benzoyl chloride, the nitro group of the amide product is then reduced and the resultant coupler amine reacted with o-sulfobenzoic anhydride as follows:

To a warm (50°) solution of 1 part of amine in 20 volumes of benzene is added a solution of 1 part of o-sulfobenzoic anhydride in 20 volumes of warm (50°) benzene. The pale yellow solution is heated for 20 minutes at the boiling point and then allowed to stand for 24 hours at room temperature. The light yellow product which separates is filtered and washed on the funnel with 10 volumes of benzene; M. P. 135°–145°.

*Analysis.*—Calcd. for $C_{47}H_{51}N_3O_{10}S$: S, 3.8. Found: S, 3.9.

*Example 3*

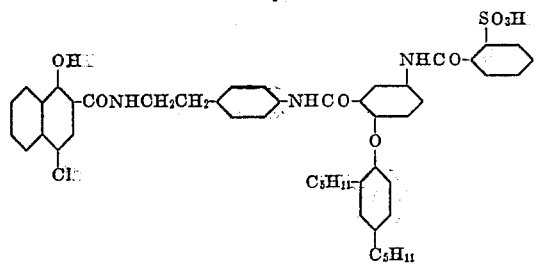

1-hydroxy-N-(4″-aminophenethyl)-4-chloro-2-naphthamide is reacted with 2-(2′,4′-di tert. amylphenoxy)-5-nitro benzoyl chloride in the presence of acetic acid and sodium acetate. The nitro group of the resultant amide is then reduced and the amino group of the resultant coupler amine reacted with o-sulfobenzoic anhydride as follows:

To a warm (60°) solution of 1.4 parts of the coupler amine in 50 volumes of benzene is added a warm (50°) solution of 1 part o-sulfobenzoic anhydride in 40 volumes of benzene. The reaction mixture is heated 20 minutes on the steam-bath and then allowed to stand 48 hours at room temperature. The solution is concentrated at reduced pressure to a powder which is triturated with three 10-volume portions of ether followed by 10 volumes of petroleum ether. A flesh-colored solid is obtained. Calcd. for $C_{49}H_{50}ClN_3O_8S$: S, 3.7. Found: S, 3.9. While this coupler and other couplers of the invention contain a chlorine atom para to the hydroxyl group of the naphthol nucleus, this position is still reactive with the color developer.

*Example 4*

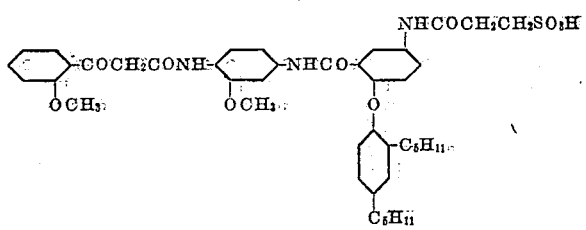

To a hot solution of 4 parts of the coupler amine which was used in Example 2 for reaction with o-sulfobenzoic anhydride, in 200 volumes of benzene is added a solution of one part of the β-sulfopropionic anhydride in 200 volumes of benzene. After standing overnight, the clear yellow solution is diluted with 400 volumes of petroleum ether, after which the product separates as an oily solid.

*Example 5*

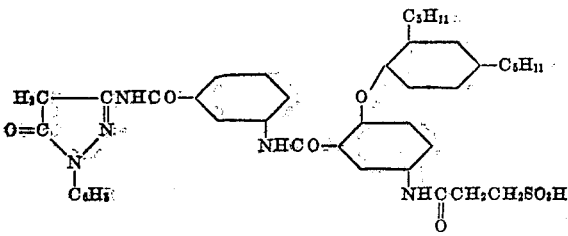

To a hot suspension of 4 parts of the pyrazolone used in Example 1 for reaction with o-sulfobenzoic anhydride in 200 volumes of benzene is added one part of the β-sulfopropionic anhydride dissolved in 100 volumes of hot benzene. The mixture clears and a white solid begins to separate. The mixture is left overnight and the product isolated by filtration.

Example 6

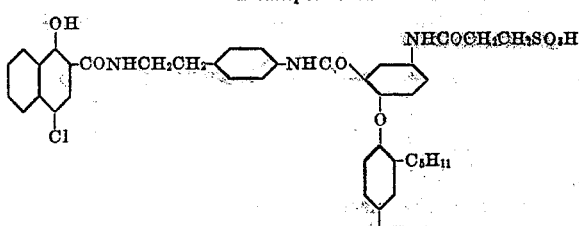

To a hot solution of 4.5 parts of the naphthamide used in Example 3 for reaction with o-sulfobenzoic anhydride in 60 volumes of benzene is added a solution of one part of β-sulfopropionic anhydride in 60 volumes of benzene. The mixture forms a clear amber solution which is allowed to stand overnight. The product is precipitated by the addition of 180 volumes of petroleum ether, filtered and dried.

Example 7

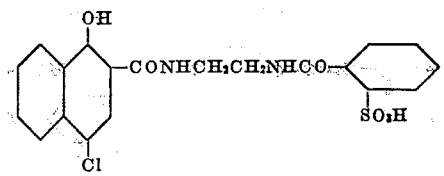

In a round-bottom flask was placed 2.6 parts of 1-hydroxy-N-(β-amino)ethyl-4-chloro-2-naphthamide compound in 220 volumes of chlorobenzene. Solution was effected by heating and to it was added a warm solution of 2.0 parts of o-sulfobenzoic anhydride in 25 volumes of chlorobenzene. The clear reaction solution was swirled thoroughly, stoppered and left standing overnight. A gummy solid which separated was filtered and dried, 3.7 parts being obtained.

ANALYSIS

|   | Calculated for $C_{20}H_{17}ClN_2O_6S$ | Found |
|---|---|---|
| C | 53.5 | 52.7 |
| H | 3.8 | 4.4 |
| N | 6.3 | 6.5 |
| Cl | 7.9 | 8.2 |

This coupler gives a cyan dye when used in a developer containing a primary aromatic amino developing agent for an exposed silver halide emulsion layer, or when used in an emulsion layer.

Example 8

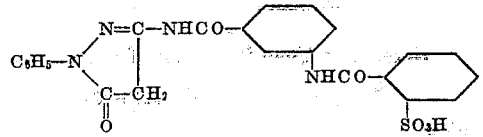

In a round-bottom flask under a reflux condenser was placed a hot solution of 2.9 parts of the 1-phenyl-3-(3'-aminobenzamido)-5-pyrazolone and 50 volumes of dioxane. To it was added with swirling 1.8 parts of o-sulfobenzoic anhydride dissolved in 25 volumes of dioxane. The reaction mixture was heated under the reflux condenser for 10 minutes and allowed to cool. The product was filtered, 5.2 parts being obtained.

ANALYSIS

|   | Calc. for $C_{22}H_{18}N_4O_6S$ | Found |
|---|---|---|
| C | 57.7 | 57.7 |
| H | 3.8 | 4.3 |
| N | 11.7 | 11.6 |
| S | 6.6 | 6.5 |

This coupler used in a developer (for an exposed silver halide emulsion layer) containing a color developing agent, yields a magenta dye image having maximum light absorption at 520 mμ which showed very little fading when exposed to ultraviolet light and heat. A similar colored image results when the coupler is used in an emulsion layer developed with a color developer.

Example 9

In a round-bottom flask under a reflux condenser was placed 2.5 parts of the amino compound and 100 volumes of dioxane (No. 2144, stored over sodium). To this solution was added with swirling 2.0 parts of o-sulfobenzoic anhydride dissolved in 10 volumes of dioxane, a solid separating. The mixture was heated under the reflux condenser for about 10 minutes and the clear supernatant portion removed by decantation from an oily residue. On cooling a solid, which crystallized, was filtered, two parts being obtained.

ANALYSIS

|   | Calc. for $C_{23}H_{19}N_3O_6S$ | Found |
|---|---|---|
| C | 60.2 | 59.6 |
| H | 4.1 | 4.7 |
| N | 6.4 | 5.9 |
| S | 7.3 | 6.8 |

This coupler when used in a developer (for an exposed silver halide emulsion layer) containing a color developing agent, yields a yellow dye image having maximum light absorption at 448 mμ which showed slight fading when exposed to ultraviolet light and heat. A yellow dye image also results when the coupler is in an emulsion which is color developed.

Example 10

The pyrazolone couplers Nos. 11, 12, 13 and 14 of the Graham U. S. patent application Serial No. 260,097 filed concurrently herewith and prepared as described in Example 6 thereof, are given as further examples of couplers containing an o-sulfophenyl group. These couplers have the formulas

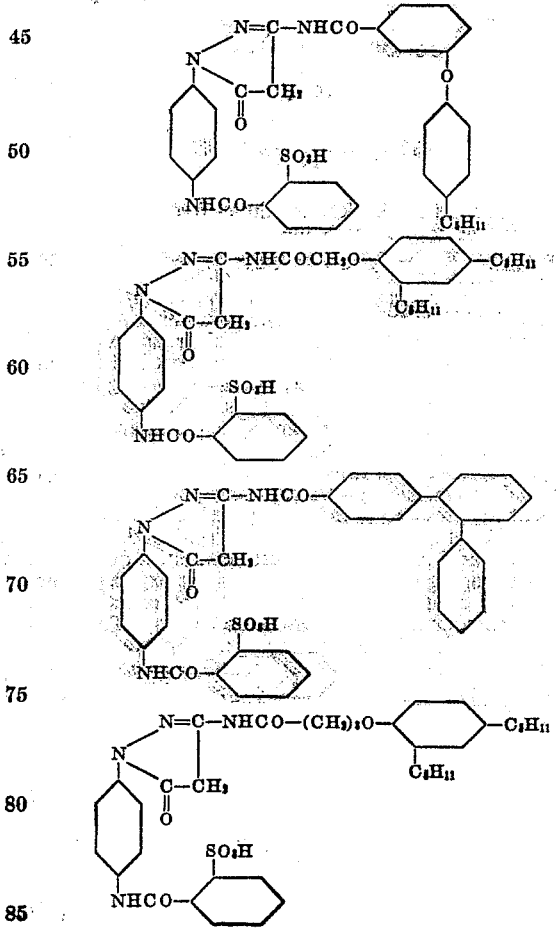

Example 11

The pyrazolone couplers Nos. 4 and 7 of the Salminen et al. U. S. patent application Serial No. 260,100 filed concurrently herewith further exemplify the couplers of the invention containing o-sulfophenyl groups. These couplers have the formulas

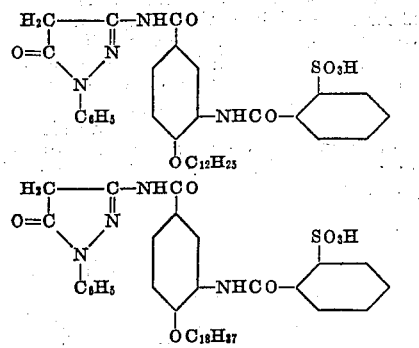

1 - phenyl - 3 - {[3' - (2" - sulfobenzamido) - 4' - octadecyloxy] - benzamido} - 5 - pyrazolone.

Example 12

Coupler No. 4 of the Graham et al. U. S. patent application Serial No. 260,097 filed concurrently herewith further illustrates the couplers of this invention. This coupler has the structure

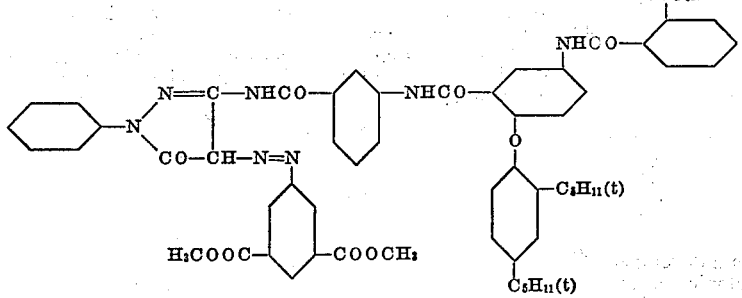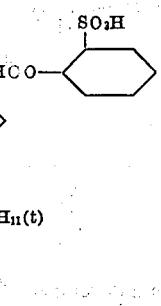

Other coupler molecules containing free amino groups which can be reacted with the anhydrides will occur to those skilled in the art, e. g. those disclosed in French Patent 836,144 or U. S. Patent 2,376,380.

As will be apparent from the above examples all of the compounds of the invention contain either a phenolic hydroxyl group (a phenol or naphthol group substituted or not), or a —$CH_2$— group such as present in a 5-pyrazolone nucleus or in a —CO—$CH_2$—CO— group of benzoylaceto or acetoaceto groups. In the formula R—CONH—Y these groups are attached directly or indirectly to the nitrogen atom.

The couplers of the invention are particularly useful in silver halide emulsion layers for color photography. By virtue of the presence of the sulfo group, dispersion of the couplers in the aqueous emulsions is facilitated.

The couplers are advantageously employed in alkaline color developing solutions for developing exposed multi-layer color films which may or may not contain other coupler compounds in the emulsion layers. The color films with which the compounds are employed contain one or more emulsion layers sensitized to record the red, green and blue light regions of the spectrum.

What we claim is:

1. The method for preparing a compound having the general formula

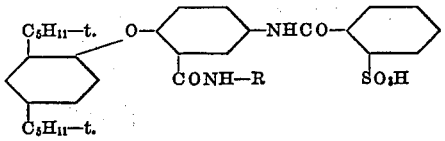

which comprises heating 2-sulfobenzoic anhydride under anhydrous conditions in an inert organic solvent for the 2-sulfobenzoic anhydride, with an amine having the general formula

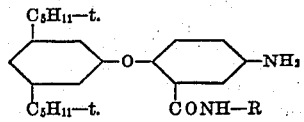

wherein R represents a monocyclic aryl group of the benzene series containing a carbonamido group.

2. The method for preparing a compound having the formula

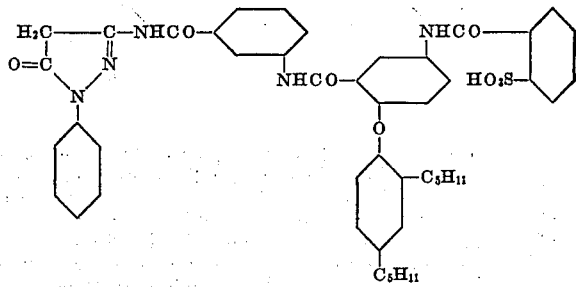

which comprises heating 2-sulfobenzoic anhydride under anhydrous conditions in toluene, with 1 - phenyl - 3 - {3'[5" - amino - 2" - (2,4 - di - tert.amylphenoxy) - benzamido] - benzamido} - 5 - pyrazolone.

References Cited in the file of this patent

UNITED STATES PATENTS

| Number | Name | Date |
|---|---|---|
| 2,186,849 | Wilmanns et al. | Jan. 9, 1940 |

FOREIGN PATENTS

| Number | Country | Date |
|---|---|---|
| 467,702 | Canada | Aug. 29, 1950 |

OTHER REFERENCES

Chem. Abstracts, vol. 15, pp. 363–4 citing Taverne, Rec. Trav. Chim. 39, 542–8 (1920).